UNITED STATES PATENT OFFICE.

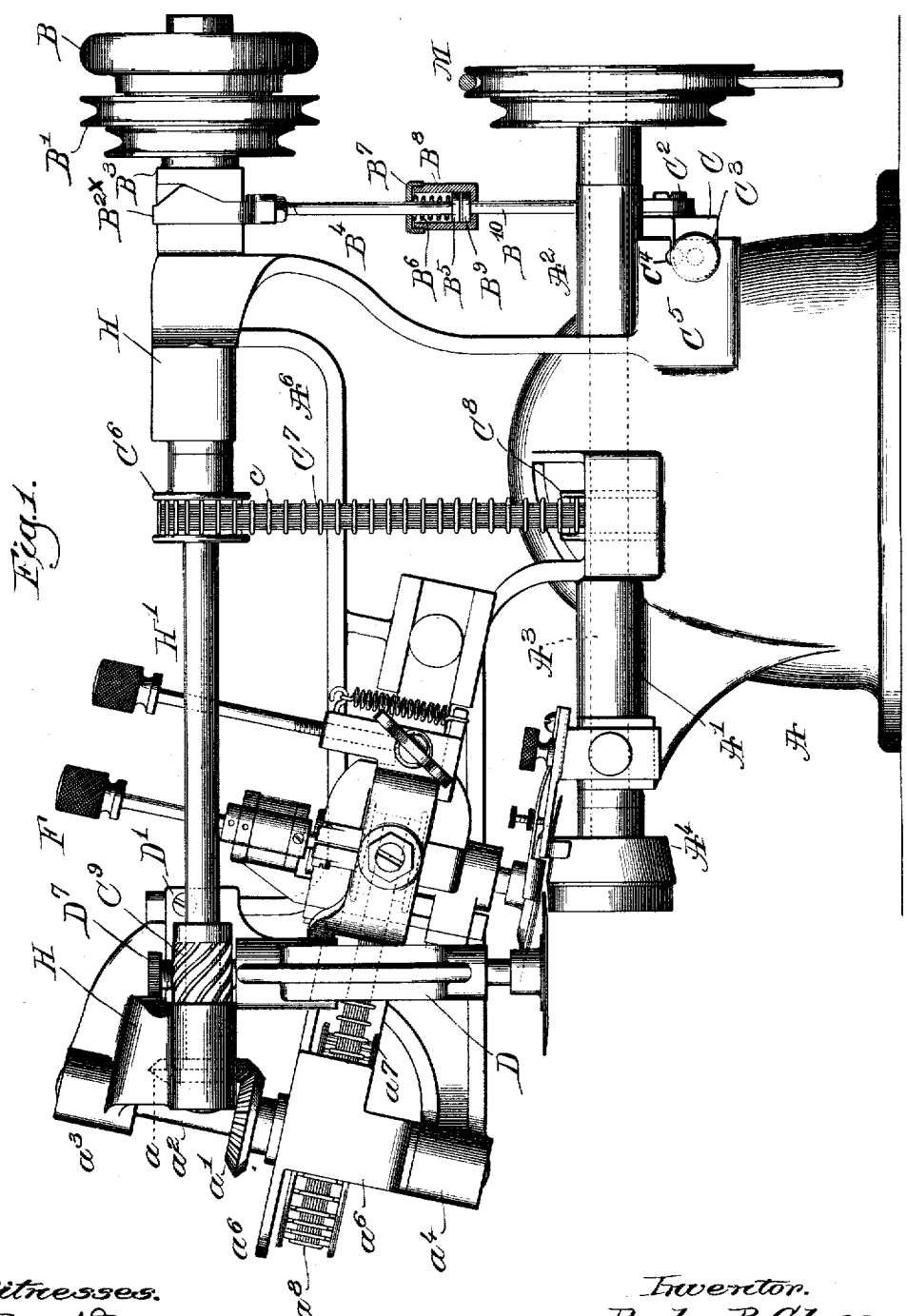

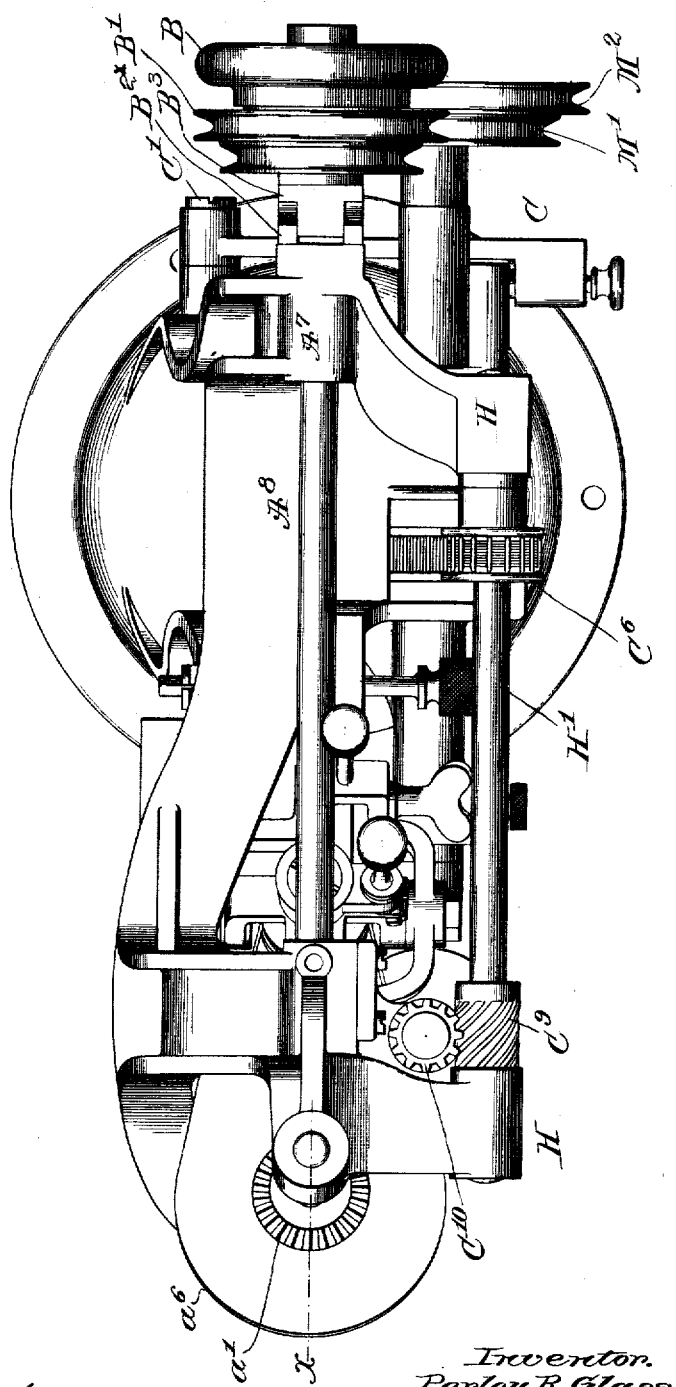

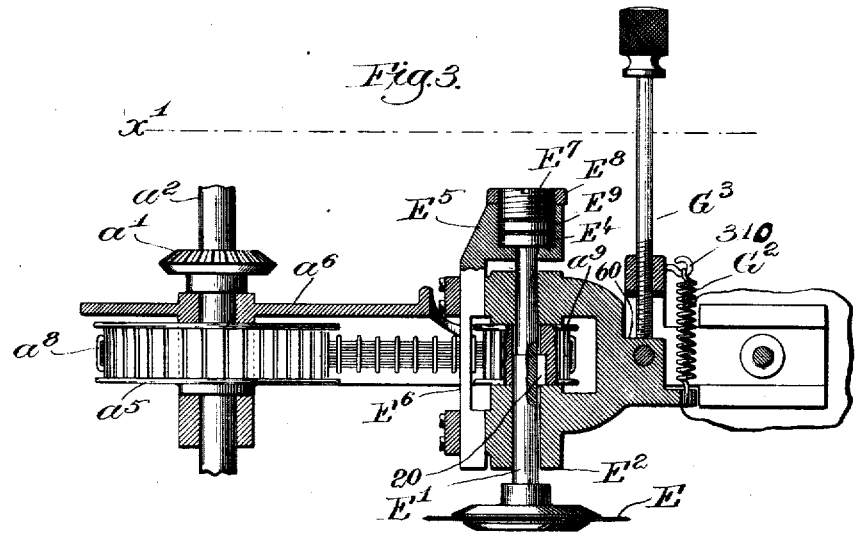
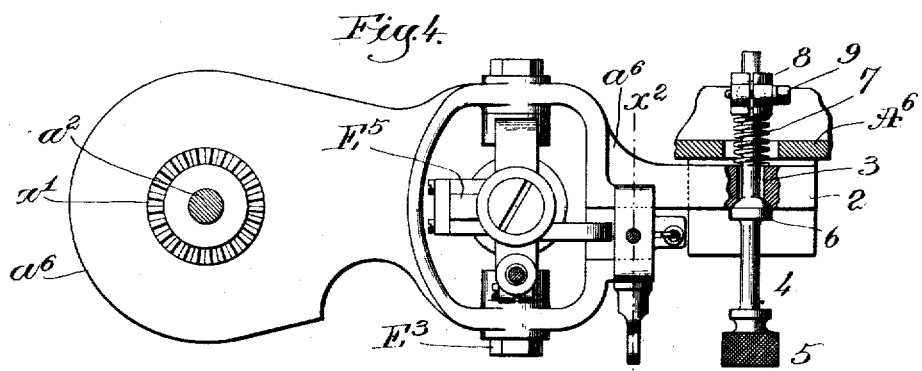
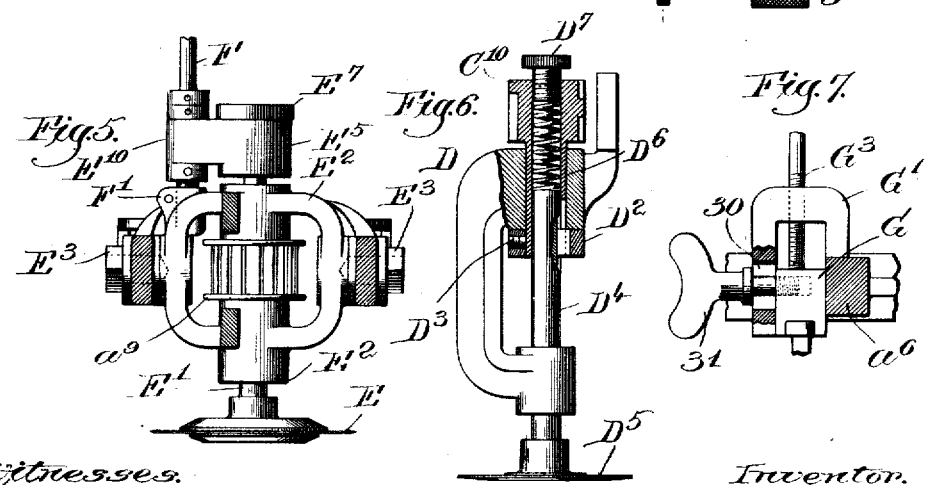

PERLEY R. GLASS, OF QUINCY, MASSACHUSETTS, ASSIGNOR TO THE PEERLESS MACHINERY COMPANY, OF BOSTON, MASSACHUSETTS.

SKIVING-MACHINE.

1,012,350. Specification of Letters Patent. Patented Dec. 19, 1911.

Application filed April 19, 1906. Serial No. 312,524.

*To all whom it may concern:*

Be it known that I, PERLEY R. GLASS, a citizen of the United States, residing at Quincy, in the county of Norfolk and State of Massachusetts, have invented an Improvement in Skiving-Machines, of which the following description, in connection with the accompanying drawing, is a specification, like letters on the drawings representing like parts.

This invention has for its object the production of a novel skiving machine wherein the stock-feeding mechanism and the shaft carrying the cutting disk are driven positively rather than by a leather belt, or frictionally.

In my invention I have provided means to drive the shaft carrying the cutting disk, and the stock-feeding mechanism, so that the cutting disk may be started before the stock-feeding means is started, thus enabling the disk to be running at speed before the stock is fed forwardly to be skived.

In my machine the speed at which the stock-feeding means feeds the stock may be varied according to the requirements of the stock without stopping the action of the cutting disk, and so also the action of the stock-feeding mechanism may be suspended while the cutting disk continues in operation.

I have also provided novel means to adjust the shaft carrying the cutting disk to control the length of the bevel or scarf.

Figure 1 is a front elevation of a skiving machine embodying my present invention; Fig. 2 a top or plan view thereof; Fig. 3 a partial section in the line $x$, Fig. 2; Fig. 4 a plan view below the dotted line $x'$, Fig. 3; Fig. 5 a detail showing the yoke in section and the pivoted bearing therein for sustaining the shaft carrying the cutting disk; Fig. 6 a broken detail showing the shaft carrying the upper member of the stock feeding mechanism and its bearing; Fig. 7 is a detail in the line $x^2$, Fig. 4.

The framework shown comprises a base A having bearings $A^2$ for the shaft $A^3$ provided at its front end with the usual work supporting feed wheel $A^4$ forming part of the stock-feeding mechanism to be described. Rising from the base A is an arm $A^6$ having bearings $A^7$ that sustain the main or driving shaft $A^8$. The shaft $A^8$ has a fast pulley B connected thereto at one end, of the frictional variety, and alongside of said fast pulley is a loose pulley $B'$, shown as grooved to receive a belt by which to drive said pulley constantly. When the pulley is pushed to the right, Fig. 1, so that its friction face engages the corresponding friction face of the fast pulley B, the shaft $A^8$ will be rotated. The engagement of the two pulleys is effected by a starting device $B^{2x}$, shown as a cam forked over a block $B^3$, said cam and block having inclines of such shape that when the cam of the starting device $B^2$ is depressed the cam surfaces coacting engage the pulleys $B'$ and B. The cam of the starting device $B^{2x}$ is carried by the upper end of a rod $B^4$ having at its lower end a head or collar $B^5$ on which rests spring $B^6$, the upper end of said spring being acted upon by a threaded member $B^7$, of a two-part nut, the other part $B^8$ being cylindrical. The bottom of said part $B^8$ receives against it a collar $B^9$ carried by a rod $B^{10}$, said two rods, the spring and nut constituting a yielding connection between the starting cam $B^{2x}$ and a lever C that may be moved when desired by the operator, said lever having its fulcrum on a stud screw $C'$, the rod $B^{10}$ being connected to said lever by a stud screw $C^2$. The lever has a locking device shown as a spring-controlled pin $C^3$, the inner end of which may be made to engage any one of a series of holes $C^4$ in the lump $C^5$ forming part of the framework. The depression of the starting device starts only the shaft $A^8$, provided at its front end with a bevel gear $a$, that engages a bevel gear $a'$ fast on a shaft $a^2$, revoluble in bearings $a^3$ and $a^4$ forming part of the framework of the machine. The shaft $a^2$ also constitutes a fulcrum for a yoke $a^6$ and is surrounded by a wheel $a^5$ about which is extended a toothed belt $a^7$ composed of several wrappings of strong cord provided at intervals with metallic teeth $a^8$, said belt also being extended over a wheel $a^9$, to be described.

Part of the yoke near its fulcrum $a^2$ is so shaped as to constitute a shield for the wheel $a^5$ and toothed belt. The opposite end 2 of the yoke $a^6$ has a hole 3 through which is extended an adjusting screw 4 having a milled end 5 to be engaged by hand. The screw 4 has a conical shoulder 6 that acts against the outer face of the free end 2 of said yoke, said screw beyond said yoke being extended through a hole in the arm $A^6$ and receiving a spring 7, and thereafter a clamping nut 8, the latter being fixed on said screw or device by a clamp screw 9.

By rotating the screw 4, its threaded inner end turning in the nut will move the yoke longitudinally in such direction as to compensate for any variations in diameter of the cutting disk E to be described, due to grinding. The cutting disk E is secured to the lower end of a shaft $E'$, mounted in a bearing $E^2$, provided with pits that receive the conical ends of point screws $E^3$, that serve to sustain said bearing so that it may be tipped about a line at right-angles to the longitudinal axis of the shaft $E'$. The shaft $E'$ is surrounded in said bearing by the wheel $a^9$, the latter having a spline 20 that enters a groove in said shaft, so that said shaft may be moved longitudinally in said bearing to adapt the edge of the cutter to the thickness of the stock being skived. The upper end of the shaft $E'$ has secured thereto a collar $E^4$, that rests at its under side in the bottom of a pocket made in an adjusting device $E^5$, having a key $E^6$ extended downwardly therefrom through a key-seat in the bearing $E^2$. The upper end of the adjusting device $E^5$ is threaded to receive a threaded block $E^7$, having a nick in its upper end for the reception of a screw-driver, the upper end of said threaded block being surrounded by a check-nut $E^8$.

Between the lower end of the threaded block and the collar $E^4$ is interposed an end-thrust bearing composed of a disk $E^9$ having a series of holes for the reception of a series of balls that contact respectively with said collar and said threaded block. The adjusting device $E^5$ has an extension $E^{10}$ through which is extended a screw F, the lower threaded end of which engages a threaded portion $F'$ connected with the bearing $E^2$. The screw F has suitable collars, one above and the other below said extension, so that when the screw is rotated its threaded end in engagement with the threaded nut $F'$ will be moved vertically, thus causing the collars on the screw to lift the adjusting device $E^5$, the latter acting on the collar $E^4$ moving the shaft $E'$ longitudinally. One end of the bearing has an extension G that enters a space of an arm $G'$ (see Fig. 7) forming part of the yoke $a^6$, said part being slotted as at 30 to receive a clamp screw 31 that enters the end G of said yoke. One extremity of the bearing has attached to it a spring $G^2$, the upper end of which is engaged with an eye 310 on the part $G'$, said spring keeping a shoulder 60 of said bearing pressed upwardly against an adjusting device $G^3$ screwed into the part $G'$ of the yoke, its end acting against the part G of the bearing. By rotating the adjusting device $G^3$ the bearing may be tipped more or less about the point screws $E^3$, thus inclining the cutting disk to the angle desired for the bevel of the scarf.

It will be noticed that the wheels $a^5$ and $a^9$ always occupy the same position one with relation to the other, and that their positions are unchanged due to either moving the shaft $E'$ longitudinally or tipping the bearing in the yoke, the extent of tipping movement being so slight as not in any way to affect the true running of the toothed belt.

From the foregoing it will be understood that the shaft $A^8$ may be started at any time and that with it will be started in motion the cutting disk.

The framework has other bearings H that receive a driven shaft $H'$ provided with a wheel $C^6$, over which is extended a toothed driving belt $C^7$, the latter comprising, as shown, several wrappings of cord and metallic teeth $c$ secured thereto. This belt is extended over a wheel $C^8$, fast on the shaft $A^3$, and when the shaft $A^3$ is rotated said belt rotates the shaft $H'$ in the same direction. The shaft $H'$ has at its opposite end a worm toothed gear $C^9$ that engages a worm $C^{10}$, having a tubular shank (see Fig. 6) extended downwardly into a stand D constituting a bearing, and connected with the framework by a screw $D'$. The tubular shank enters a collar $D^2$ that is secured to said shank by a set screw $D^3$, said collar being connected by a spline with a shaft $D^4$ provided at its lower end with a second member $D^5$ of stock-feeding means, said member being shown as a disk. This member must be held yieldingly in contact with the stock supported by the feed-wheel $A^4$, and consequently for such purpose I employ a spring $D^6$, acting upon the upper end of the shaft $D^4$, said spring being made adjustable as to its strength by means of an adjusting screw $D^7$ screwed into the upper end of the worm $C^{10}$, said screw being adjustable to control the desired amount of pressure of the member $D^5$ on the stock.

Whenever the operator moves the lever C downwardly the starting device forces the loose pulley in contact with the fast pulley, and immediately the rotation of the shaft $A^8$ is started and the shaft carrying the disk cutter is also started at speed, after this the stock-feeding mechanism is started separately. The pulley $B'$ has a second or smaller belt pulley forming a part thereof, on which the usual driving belt may be placed to drive the shaft $A^8$ at a faster speed.

The shaft $A^3$ of the stock feeding mechanism is driven independently of the shaft $A^8$ by a belt M surrounding one or the other of two pulleys $M'$ or $M^2$, said belt being extended about a clutch or other pulley, not shown, on a shaft under the control of the foot of the operator and forming part of any usual constantly moving power driven transmission device, such as is commonly used in connection with sewing machines to drive the same, or to stop the movement of the machine instantly at will.

It will be understood that the tubular shank of the worm $C^{10}$ revolves in the bearing stand D and that the collar $D^2$ prevents longitudinal movement of said tubular shank in said bearing during its revolution. The shaft $D^4$ is driven through the spline connecting it with said bearing.

Having described my invention, what I claim as new and desire to secure by Letters Patent, is:

1. In a machine of the class described, a shaft carrying a cutting disk, a yoke, a bearing for said shaft, pivots sustaining said bearing, a wheel sustained by said bearing between said pivots and connected loosely by a spline with said shaft, and means to rotate said wheel positively.

2. In a machine of the class described, a shaft carrying a cutting disk, a yoke, a bearing for said shaft, pivots sustaining said bearing, a wheel sustained by said bearing between said pivots and connected loosely by a spline with said shaft, means to rotate said wheel positively, and means to adjust said shaft longitudinally of said wheel to adapt the cutting disk to the thickness of the stock.

3. In a machine of the class described, a shaft carrying a cutting disk, a yoke, a bearing for said shaft, pivots sustaining said bearing, a wheel sustained by said bearing between said pivots and connected loosely by a spline with said shaft, means to rotate said wheel positively, and means to turn said bearing about its sustaining pivots to determine the length of the bevel.

4. In a machine of the class described, a shaft carrying a cutting disk, a yoke, a bearing for said shaft, pivots sustaining said bearing, a wheel sustained by said bearing between said pivots and connected loosely by a spline with said shaft, means to rotate said wheel positively, means to turn said bearing about its sustaining pivots to determine the length of the bevel, and means to lock said bearing in its adjusted position.

5. In a machine of the class described, a yoke, a cutter shaft, a bearing for said cutter shaft pivotally mounted to swing transversely in said yoke, a shaft adjusting device keyed on said bearing to move longitudinally thereof, and provided with antifriction end-thrust means coacting with said shaft, adjusting means connecting the said shaft-adjusting device and bearing whereby the former may be adjusted with respect to the latter and thus compensate for wear due to the end-thrust movement of said shaft in said bearing.

6. In a machine of the class described, a shaft carrying a cutting disk, a yoke, a fulcrum for said yoke, a bearing sustained in said yoke substantially parallel with said fulcrum to sustain said shaft, and a device to turn said yoke about its fulcrum to adjust the operative position of the cutting disk according to the diameter of the cutting disk.

7. In a machine of the class described, a shaft carrying a cutting disk, a yoke, a fulcrum for said yoke, a bearing sustained in said yoke to sustain said shaft, a device to turn said yoke about its fulcrum to adjust the operative position of the cutting disk according to its diameter, and means acting on said bearing to tip the same in said yoke to define the length of the bevel of the scarf.

8. In a machine of the class described, a driven shaft, a secondary shaft driven thereby and having a wheel fast thereon, a yoke having its fulcrum on said secondary shaft, a bearing pivoted in said yoke, a wheel mounted loosely in said bearing, a shaft splined loosely on said wheel, a cutting disk carried by said shaft, means to move the shaft carrying said cutting disk longitudinally with relation to said wheel, and a belt connecting said wheels to drive the same and rotate said cutting disk positively.

9. In a machine of the class described, a driven shaft, a secondary shaft driven thereby and having a wheel fast thereon, a yoke having its fulcrum on said secondary shaft, a bearing pivoted in said yoke, a wheel mounted loosely in said bearing, a shaft on which said wheel is splined loosely, a cutting disk carried by said shaft, means to move the shaft carrying said cutting disk longitudinally with relation to said wheel, means connecting said wheels, one driving the other positively, and means to turn said yoke about said secondary shaft, said wheel and the shaft carrying said cutting disk moving at such time in the arc of a circle about said fulcrum.

10. In a machine of the class described, a yoke, a bearing pivoted therein to swing transversely thereof, a shaft in said bearing, a shaft adjusting device, means for preventing rotation of said device with said shaft, a screw carried by said shaft adjusting device and engaging a threaded part of said bearing, whereby upon the rotation of said screw the said shaft may be adjusted in said bearing.

11. In a machine of the class described, a yoke, a bearing pivoted therein transversely thereof, a shaft in said bearing, a shaft adjusting device, a screw carried by said shaft adjusting device and engaging a threaded part of said bearing, the rotation of said screw in one or the other direction moving said shaft in said bearing, and a device carried by said yoke and coacting with said bearing to turn said bearing about its pivots at right angles to the longitudinal axis of said shaft.

In testimony whereof, I have signed my name to this specification, in the presence of two subscribing witnesses.

PERLEY R. GLASS.

Witnesses:
GEO. W. GREGORY,
EVANGELINE C. BROWN.

Copies of this patent may be obtained for five cents each, by addressing the "Commissioner of Patents, Washington, D. C."